(12) United States Patent
Hirano et al.

(10) Patent No.: US 12,110,831 B2
(45) Date of Patent: Oct. 8, 2024

(54) GAS TURBINE ALLOWING HYDROGEN TO BE USED AS FUEL

(71) Applicant: TOYOTA JIDOSHA KABUSHIKI KAISHA, Toyota (JP)

(72) Inventors: Shigeru Hirano, Mishima (JP); Yasushi Tatebayashi, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/533,313

(22) Filed: Dec. 8, 2023

(65) Prior Publication Data
US 2024/0254930 A1    Aug. 1, 2024

(30) Foreign Application Priority Data
Jan. 31, 2023   (JP) .................................. 2023-013462

(51) Int. Cl.
*F02C 9/48* (2006.01)

(52) U.S. Cl.
CPC .......... *F02C 9/48* (2013.01); *F05D 2270/082* (2013.01); *F05D 2270/304* (2013.01)

(58) Field of Classification Search
CPC ...... F02C 9/48; F02C 9/52; F02C 9/54; F05D 2270/082; F05D 2270/304; B64D 37/30; B64D 37/34
See application file for complete search history.

(56) References Cited

U.S. PATENT DOCUMENTS

| 4,683,715 | A | * | 8/1987 | Iizuka | F02C 9/18 60/778 |
|---|---|---|---|---|---|
| 6,230,479 | B1 | * | 5/2001 | Kawamura | F02C 9/26 60/776 |
| 11,846,426 | B2 | * | 12/2023 | Giridharan | F02C 3/20 |
| 2002/0043067 | A1 | | 4/2002 | Maeda et al. | |
| 2014/0090392 | A1 | * | 4/2014 | Meisner | F02C 9/26 60/39.23 |
| 2019/0162414 | A1 | | 5/2019 | Ogata et al. | |
| 2020/0080480 | A1 | | 3/2020 | Horikawa et al. | |

FOREIGN PATENT DOCUMENTS

| JP | H07-233945 A | 9/1995 |
|---|---|---|
| JP | 2016-023916 A | 2/2016 |
| JP | 2018-004138 A | 1/2018 |
| JP | 2018-194210 A | 12/2018 |

* cited by examiner

*Primary Examiner* — Jason H Duger
(74) *Attorney, Agent, or Firm* — Oliff PLC

(57) ABSTRACT

A gas turbine is configured such that: in the case where the rotation speed of the turbine shaft is a predetermined rotation speed, when the magnitude of a load is set to a predetermined load, a compressed air quantity that is supplied to a primary combustion field in a combustor and a fuel quantity that is supplied to the combustor are controlled to quantities for an equivalent ratio that allows misfire to avoided; and when the magnitude of the load is set to no load, the compressed air quantity that is supplied to the primary combustion field in the combustor and the fuel quantity that is supplied to the combustor are reduced compared to when the magnitude of the load is set to the predetermined load, while the equivalent ratio that allows the misfire to be avoided is kept.

4 Claims, 2 Drawing Sheets

GAS TURBINE ALLOWING HYDROGEN TO BE USED AS FUEL

CROSS-REFERENCE TO RELATED APPLICATION

This application claims priority to Japanese Patent Application No. 2023-013462 filed on Jan. 31, 2023, incorporated herein by reference in its entirety.

BACKGROUND

1. Technical Field

The present disclosure relates to a gas turbine engine (referred to as a "gas turbine", hereinafter), and more specifically, relates to control of a gas turbine (hydrogen gas turbine) allowing hydrogen to be used as fuel.

2. Description of Related Art

Development research for a heat engine such as a gas turbine in which the fuel is hydrogen has been advanced from the standpoint of global warming prevention and decarbonization. In the case where the fuel is hydrogen, when a combustion field includes a region where fuel concentration is high, combustion temperature becomes high, and NOx generation quantity easily increases. Therefore, for a combustor of the gas turbine in which the fuel is hydrogen, various configurations in which the region where the fuel concentration is high is not formed in the combustion field as much as possible have been studied. For example, Japanese Unexamined Patent Application Publication No. 2016-23916 proposes a configuration for realizing stable combustion in a sequence of operation process from the firing in the gas turbine to the rated load and achieving increase in efficiency, decrease in NOx, and reduction in the number of components. In this configuration, in a gas turbine combustor employing a previous-mixing combustion scheme for uniformizing the temperature of the flame that is formed in a combustion chamber and restraining an NOx discharge quantity by supplying air-fuel mixture in which fuel and air are previously mixed to the combustion chamber, the fuel-air ratio of the previously mixed gas is accurately controlled. Specifically, the literature discloses a configuration provided with: an annular fuel nozzle including an annular pipe in which a plurality of fuel injection holes is formed on a burner for supplying fuel and air to the combustion chamber and a plurality of supply pipes connected to the annular pipe; and an air hole plate that is arranged on the downstream side of the annular fuel nozzle so as to be away from the annular fuel nozzle and on which a plurality of air holes is formed so as to face the plurality of fuel injection holes. Japanese Unexamined Patent Application Publication No. 7-233945 proposes a configuration for achieving stable combustion and decrease in NOx discharge in the whole load range for the gas turbine. This configuration includes: a plurality of stages of combustion portions that is disposed at intervals in the axial direction of a combustor of the gas turbine; a plurality of fuel supply systems that is independently coupled to the combustion portions, respectively; a previously-mixed fuel supply portion and a diffusion combustion fuel supply portion that are provided in the fuel supply systems, respectively; and a control device that performs fuel supply for only one of previously-mixed fuel and diffusion combustion fuel by switching between the fuel supply portions. Further, the combustion is started in a diffusion combustion scheme allowing the stable combustion in a wide fuel-air ratio range, and thereafter switching to a previously-mixed combustion scheme is performed. Japanese Unexamined Patent Application Publication No. 2018-194210 proposes an operation method for preventing the generation of unburned gas at the time of start and the time of stop while realizing low NOx combustion in a gas turbine engine combustor that uses high-reactive fuel such as hydrogen. In this operation method, a plurality of fuel injection portions is annularly disposed, main fuel that is high-reactive fuel is injected from some of the plurality of fuel injection portions, and auxiliary fuel that is not high-reactive fuel and the main fuel are injected in a switching manner from some other fuel injection portions. At the time of start, the auxiliary fuel is injected and ignited. Thereafter, the switching to the main fuel is executed, and a rated rotation operation is executed. At the time of stop, the switching from the main fuel to the auxiliary fuel is executed, and the rotation is decelerated. Japanese Unexamined Patent Application Publication No. 2018-4138 proposes that in a combustor of a gas turbine engine having a multistate burner configuration including a main burner for supplying fuel or previously mixed gas to a primary combustion region on the upstream side in the combustion chamber and an additional heating burner for supplying the fuel or previously mixed gas to a secondary combustion region on the downstream side of the primary combustion region in the combustion chamber, for promoting the previous mixing between hydrogen-containing gas injected from the additional heating burner and compressed air, after the fuel and air are injected from an injection hole of the additional heating burner, the air-fuel mixture is caused to pass through a duct having a certain length and then is fed into the combustion chamber, so that the fuel and the air are sufficiently mixed and combusted.

SUMMARY

As described above, for the combustor of the gas turbine (hydrogen gas turbine) in which the fuel is hydrogen in the related art, typically, the supply structure for the fuel and the compressed air, as exemplified by a combustion nozzle for supplying the fuel and the compressed air to the combustion field, has been improved, in order not to generate the region having the high fuel concentration for restraining the NOx generation quantity. However, as described above, the structure in the related art is a somewhat complicated structure, and the number of components is large. Although a combustor for a middle-size or large-size gas turbine can be configured, in the case of a combustor for a small-size gas turbine, the production is difficult, for example, it is difficult to process and form many minute holes on a small component. Further, when the number of components is large, the benefit of the lightness of the small-size gas turbine is lost. Accordingly, a technique of avoiding the formation of the region having the high fuel concentration in the combustion field without complicating the supply structure for the fuel and the compressed air has an advantage in that it is possible to use the configuration in which the NOx generation quantity is restrained, in various hydrogen gas turbines, regardless of the size.

In the operation of the gas turbine, generally, first, at the time of start-up, while a turbine shaft is rotated by a starter, the fuel supply to the combustor is started, and the ignition is performed. Thereafter, in a state with no load, the fuel quantity is increased, and the rotation speed of the turbine shaft is raised to a predetermined rotation speed, for example, to a rated rotation speed. After the operation state with the predetermined rotation speed and no load is established, the fuel quantity is increased for increasing the load (electricity generation in the case of an electricity generator) to a predetermined load, for example, to a rated load, while the predetermined rotation speed is kept. In this operation technique, the equivalent ratio (fuel quantity/compressed air quantity) at the vicinity (primary combustion field) of a fuel supply site in the combustion field is adjusted such that misfire is avoided in the operation state with the predetermined rotation speed and no load. Therefore, when the fuel quantity is increased and supplied for increasing the load from no load to the predetermined load while the rotation speed is kept at the predetermined rotation speed, the equivalent ratio at the primary combustion field becomes locally high, and the NOx generation quantity increases (in the above related art, the supply structure for the fuel and the compressed air is devised such that the local rise in the equivalent ratio at the primary combustion field is restrained).

When the fuel quantity is increased for increasing the load from no load to the predetermined load as described above, the compressed air quantity that is supplied to the primary combustion field may be increased as a technique for decreasing the equivalent ratio at the primary combustion field for restraining the NOx generation quantity. In this regard, in the research performed by the inventor of the present disclosure, it was possible to increase the compressed air quantity that was supplied to the primary combustion field such that the equivalent ratio at the primary combustion field could be restrained in the operation state with the predetermined rotation speed and the predetermined load. However, when the fuel quantity was reduced with the same compressed air quantity for putting the operation state into the state with the predetermined rotation speed and no load, the misfire occurred because the equivalent ratio was excessively low. Ordinarily, the actual gas turbine is operated in the operation state with the predetermined rotation speed and the predetermined load (for example, in the operation state with the rated rotation speed and the rated load), and therefore it is desirable that the equivalent ratio at the primary combustion field can be restrained in the operation state with the predetermined rotation speed and the predetermined load. However, depending on the operation situation, it is desired that the operation state with the predetermined rotation speed and no load can be also realized without the misfire. That is, the gas turbine has an advantage when the equivalent ratio is reduced in the operation state with the predetermined rotation speed and the predetermined load, which is executed for a long time, for restraining the NOx generation quantity as much as possible, and therewith the misfire can be avoided by reducing the compressed air quantity only at the time of the execution of the operation state with the predetermined rotation speed and no load. With this configuration, it is possible to restrain the NOx generation quantity, without using the complicated supply structure for the fuel and the compressed air for restraining the local rise in the equivalent ratio at the primary combustion field, unlike the above related art.

Thus, an object of the present disclosure is to reduce the discharge quantity of NOx in the gas turbine in which the hydrogen can be used as the fuel.

Further, another object of the present disclosure is to provide a configuration in which the operation state with the predetermined rotation speed and no load can be also achieved in the above gas turbine having a configuration in which the compressed air quantity that is supplied to the primary combustion field is further increased such that the equivalent ratio at the primary combustion field in the combustor is restrained so as to be lower in the operation state with the predetermined rotation speed and the predetermine load.

With the present disclosure, the above objects are achieved by a gas turbine including:
 a combustor to which fuel and compressed air to be combusted are supplied;
 a fuel supply controller that controls a fuel quantity that is supplied to the combustor;
 a load controller that controls the magnitude of a load that acts on a turbine shaft; and
 an air supply quantity controller that controls a compressed air quantity that is supplied to a primary combustion field in the combustor, in which
 in a case where the rotation speed of the turbine shaft is a predetermined rotation speed, when the load controller sets the magnitude of the load to a predetermined load, the air supply quantity controller and the fuel supply controller respectively control the compressed air quantity that is supplied to the primary combustion field in the combustor and the fuel quantity that is supplied to the combustor, to quantities for an equivalent ratio that allows misfire to be avoided, and when the load controller sets the magnitude of the load to no load, the air supply quantity controller and the fuel supply controller respectively reduce the compressed air quantity that is supplied to the primary combustion field in the combustor and the fuel quantity that is supplied to the combustor, compared to when the magnitude of the load is set to the predetermined load, while the equivalent ratio that allows the misfire to be avoided is kept.

In the above configuration, the "gas turbine" may be an arbitrary type of gas turbine in which a compressor, a turbine, and a load apparatus on which the load acts, as exemplified by an electricity generator, are coupled to a turbine shaft. The "combustor" may be an arbitrary type of combustor such as a can type and an annular type, for example. The "fuel supply controller" may be means for adjusting the fuel quantity that is supplied into the combustion chamber, by an arbitrary scheme. The "load controller" may be means for controlling the magnitude of the load (work quantity or work rate) that acts on the turbine shaft, by an arbitrary scheme. In the case where the gas turbine is used as a dynamic power source of an electricity generator, the load may be the electricity generation quantity or generated electric power that is output to the electricity generator, and the load controller may be means for adjusting the electricity generation quantity or generated electric power for the electricity generator. The "air supply quantity controller" may be means for controlling the compressed air quantity that is supplied to the primary combustion field in the combustor, by an arbitrary scheme. As described already, the "primary combustion field" is a combustion field on the upstream side within the combustion chamber of the combustor, and means a region at the vicinity of a fuel supply site such as a fuel injection hole. The specific range of the primary combustion field, which differs depending on the shape of the combustion chamber, may be approximately a range from an upstream edge of the flame due to the combustion of the fuel and the compressed air on the upstream side along a gas flow direction within the combustion chamber to a site where additional compressed air is supplied on the downstream side along the gas flow direction (ordinarily, the compressed air is supplied into the combustion chamber at a plurality of stages along the gas flow direction within the combustion chamber). Specifically, for example, the air supply quantity controller may include a valve structure provided in a flow passage through which the compressed air is fed from a compressor of the gas turbine to the primary combustion field, and when the air supply quantity controller reduces the compressed air quantity that is supplied to the primary combustion field in the combustor, some of the compressed air may be caused to escape from the flow passage through the valve structure. Thereby, some of the compressed air that flows through the flow passage through which the compressed air is fed from the compressor to the primary combustion field may be released to the exterior or others without flowing into the primary combustion field. As the valve structure, a valve that is provided on a flow passage from the compressor to the combustor in an ordinary gas turbine may be appropriately used. Further, the adjustment of the compressed air quantity that is supplied to the primary combustion field when the compressed air is caused not to escape through the valve structure can be achieved by appropriately adjusting the bore of a supply port for feeding the compressed air to the primary combustion field. The "predetermined rotation speed" may be a rotation speed that can be appropriately set based on experiments and the like and at which the gas turbine rotates stably or efficiently, and may be a "rated rotation speed" (a rated value of the rotation speed) that is a rotation speed at the time of an ordinary operation of the gas turbine. The "predetermined load" may be a magnitude of the load that can be appropriately set based on experiments and the like and at which the gas turbine performs output stably or efficiently, and may be a "rated load" (a rated value of the load) that is a load at the time of the ordinary operation of the gas turbine.

In the configuration in the present disclosure, as described above, in the case where the rotation speed of the turbine shaft is the predetermined rotation speed, when the load controller sets the magnitude of the load to the predetermined load, the air supply quantity controller and the fuel supply controller respectively control the compressed air quantity that is supplied to the primary combustion field in the combustor and the fuel quantity that is supplied to the combustor, to quantities for the equivalent ratio that allows the misfire to be avoided, and when the load controller sets the magnitude of the load to no load, the air supply quantity controller and the fuel supply controller respectively reduce the compressed air quantity that is supplied to the primary combustion field in the combustor and the fuel quantity that is supplied to the combustor, compared to when the magnitude of the load is set to the predetermined load, while the equivalent ratio that allows the misfire to be avoided is kept. That is, in the case of the configuration in the present disclosure, in the operation state with the predetermined rotation speed and no load, not only the fuel quantity but also the compressed air quantity that is supplied to the primary combustion field are reduced compared to in the operation state with the predetermined rotation speed and the predetermined load, for keeping the equivalent ratio that allows the misfire to be avoided.

With the above configuration in the present disclosure, it is possible to adjust the compressed air quantity that is supplied to the primary combustion field at the time of the operation state with the predetermined rotation speed and no load, such that the misfire is avoided, separately from the time of the operation state with the predetermined rotation speed and the predetermined load. Therefore, it is not necessary to raise the equivalent ratio in the operation state with the predetermined rotation speed and the predetermined load, for securing a high equivalent ratio for preventing the misfire in the state with the predetermined rotation speed and no load. Thereby, it is possible to further reduce the equivalent ratio in the operation state with the predetermined rotation speed and the predetermined load, within a range in which the misfire is avoided, and therefore to restrain the generation quantity of NOx. Further, it should be understood that the present disclosure can achieve the restraint of the NOx generation quantity without using complicated supply structures for the fuel and the compressed air that are proposed in the above prior documents.

In the above configuration, as described already, the compressed air quantity in the state with the predetermined rotation speed and no load is appropriately controlled. Therefore, it is possible to reduce the equivalent ratio at the primary combustion field in the state with the predetermined rotation speed as the rotation speed of the turbine shaft and the predetermined load, within the range in which the misfire is avoided, and thereby to restrain the generation quantity of NOx as much as possible. Accordingly, in the above configuration of the present disclosure, the compressed air quantity that is supplied to the primary combustion field in the combustor when the rotation speed of the turbine shaft is the predetermined rotation speed and the magnitude of the load is the predetermined load may be a quantity that causes the equivalent ratio at the primary combustion field to be an available lower limit of the equivalent ratio that allows the misfire to be avoided in an operation state with the predetermined rotation speed and the predetermined load. That is, the compressed air quantity to the primary combustion field may be maximized within an available range in which the misfire is avoided in the operation state with the predetermined rotation speed and the predetermined load.

In the above configuration in the present disclosure, when the rotation speed of the turbine shaft is the predetermined rotation speed, the air supply quantity controller may reduce the compressed air quantity that is supplied to the primary combustion field in the combustor, as the magnitude of the load is smaller. Thereby, even when the magnitude of the load changes, it is possible to reduce the equivalent ratio such that the NOx generation quantity is restrained within the range in which the misfire is avoided.

The above configuration in the present disclosure is suitably applied in the case where hydrogen is used as the fuel of the gas turbine. Therefore, the fuel may be hydrogen, but is not limited to this.

In the gas turbine, ordinarily, the compressed air quantity that is put in the primary combustion field is uniquely decided by the rotation speed. Put simply, the above gas turbine in the present disclosure is configured such that the compressed air quantity that is put in the primary combustion field is controlled so as to be different between the state with the predetermined rotation speed and the predetermined load and the state with the predetermined rotation speed and no load. Because of this configuration, as described already, without causing the misfire in the state with the predetermined rotation speed and no load, it is possible to reduce the equivalent ratio in the state with the predetermined rotation speed and the predetermined load, and to reduce the NOx generation quantity. What is important is that the NOx generation quantity is expected to be reduced in the configuration in the present disclosure by improving the operation process for the gas turbine, without requiring a complicated improvement of the supply site for the fuel and the compressed air. Therefore, it should be understood that the configuration in the present disclosure can be applied even to a small-size gas turbine for which it is difficult to realize a complicated structure, regardless of the size of the gas turbine. The gas turbine in the present disclosure can be utilized as a small-size gas turbine that can be equipped in a vehicle such as an automobile and in which hydrogen is used as the fuel, and thereby the hydrogen gas turbine is expected to spread over a wider range.

Other purposes and advantages of the present disclosure will become clear in the following description about preferred embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Basic Configuration of Gas Turbine

Figure 1A:
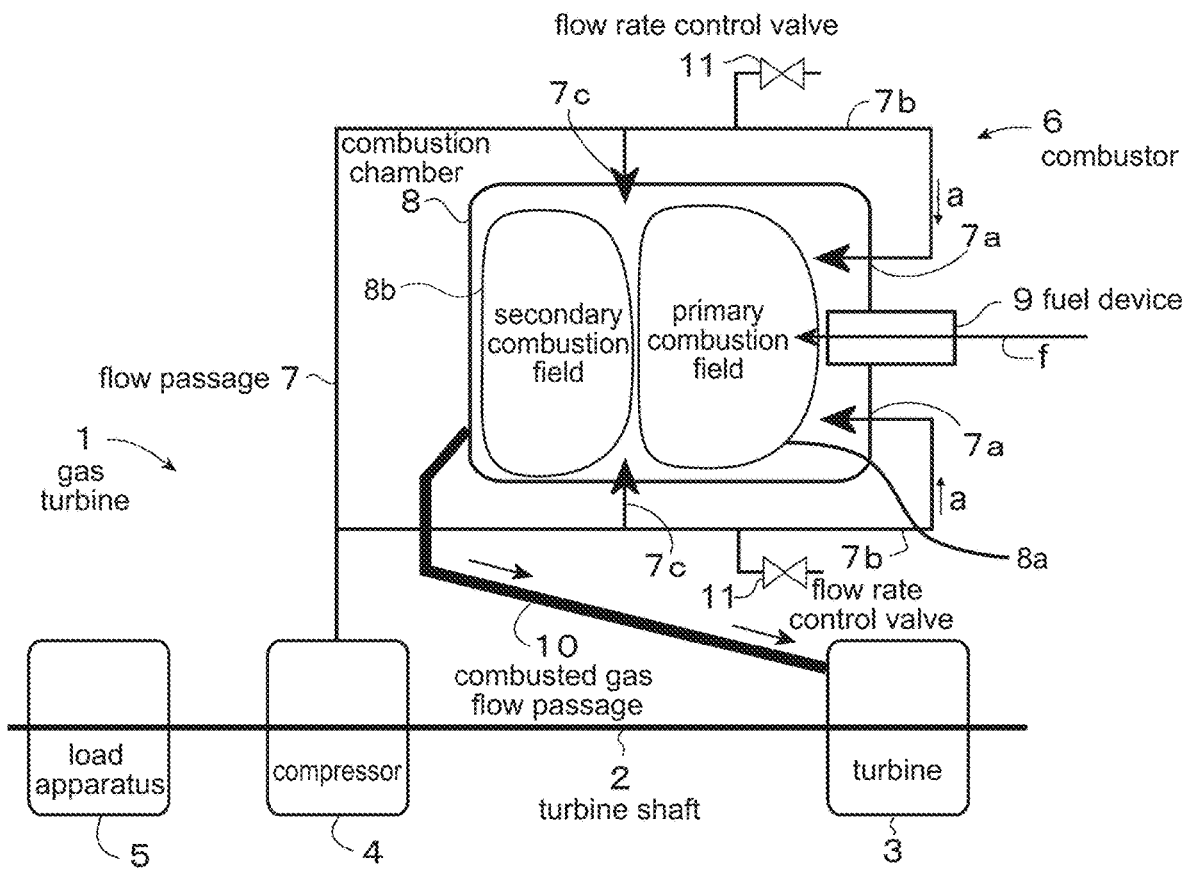
FIG. 1A is a diagram showing a schematic view of a gas turbine according to an embodiment and the configuration of a control device of the gas turbine as a block diagram.

A configuration in an embodiment can be applied to various gas turbines. As shown in FIG. 1A, in a basic configuration, a gas turbine 1 may include a turbine 3, a compressor 4, a load apparatus 5 such as an electricity generator, and a combustor 6 that are coupled to a turbine shaft 2. In a basic actuation, air (compressed air) a compressed in the compressor 4 by the rotation of the turbine shaft 2 is fed to a combustion chamber 8 of the combustor 6 through a flow passage 7, and in the combustion chamber 8, is mixed with fuel f from a fuel supply device 9, to be combusted. The combusted gas is fed to the turbine 3 through a combusted gas flow passage 10, and rotates the turbine shaft 2. Thereby, the compression of the air in the compressor 4 and the actuation of the load apparatus 5, for example, the electricity generation due to the rotation of a rotator of the electricity generator are executed. Further, as to the combustor 6, more specifically, for better combustion of the fuel and the air, typically, the compressed air a is fed into the combustion chamber 8 in a plurality of steps. Specifically, some of the compressed air a is injected from a supply port 7a at the vicinity (a right-side region in the combustion chamber in the figure; a primary combustion field 8a) of a supply port for the fuel f of a fuel device 9, and is mixed with the fuel f in various ways. Some other compressed air a is released from a supply port 7c to a region (secondary combustion field 8b) on the downstream side of the primary combustion field 8a. The fuel that is supplied to the combustor 6 may be hydrogen (the fuel is not limited to this). In this regard, in the gas turbine to which the embodiment is applied, even when the fuel is hydrogen, the specific structure of the combustor 6 may be an arbitrary structure, for example, a conventional structure in which fossil fuel is used as the fuel, and special configurations described in the above patent literatures are not essential.

In the gas turbine 1 in the embodiment, particularly, an air supply quantity controller for adjusting the compresses air that is supplied from the supply port 7a to the primary combustion field 8a is provided. As the air supply quantity controller, for example, as shown in the figure, a flow rate control valve 11 that causes the compressed air flow to escape to the exterior or others may be provided in the middle of a flow passage 7b to the supply port 7a, and the compressed air quantity that is put in the primary combustion field 8a from the supply port 7a may be capable of being adjusted by controlling the flow rate at the flow rate control valve 11. As the flow rate control valve 11, a valve that is provided on a flow passage from the compressor to the combustor in an ordinary gas turbine may be appropriately used.

Configuration of Control Device of Gas Turbine

Figure 1B:
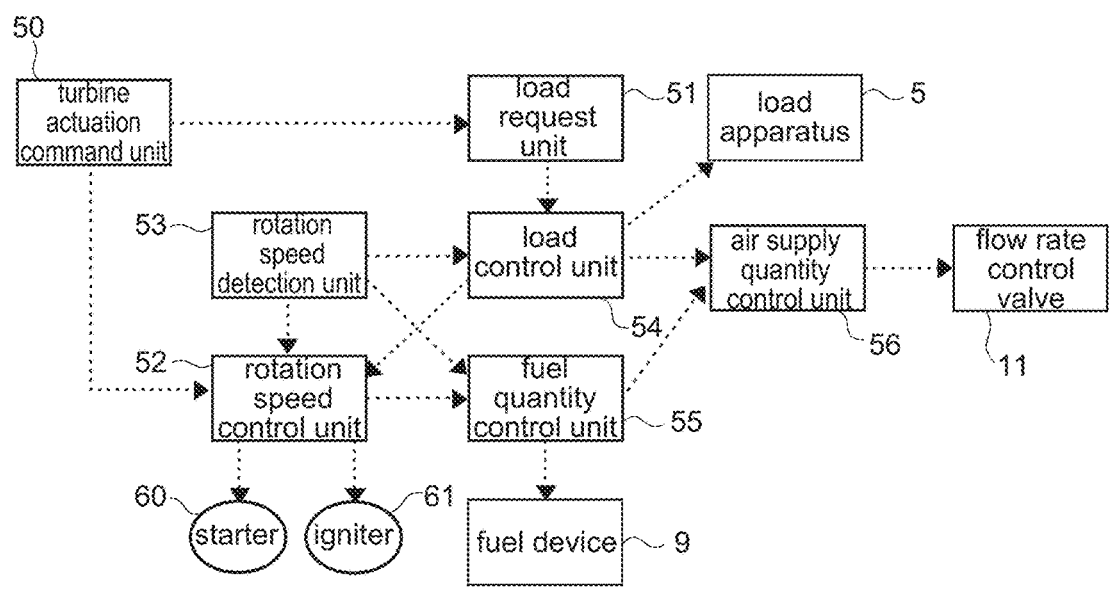
FIG. 1B is a diagram showing a schematic view of the gas turbine according to the embodiment and the configuration of the control device of the gas turbine as a block diagram.

The control of the gas turbine in FIG. 1A may be executed by a control device as schematically shown in FIG. 1B. The control device may be an ordinary type of computer device including a CPU, a ROM, a RAM, and an input-output port device that are mutually coupled by bidirectional common paths, and the configuration and actuation of each later-described unit in the embodiment may be realized by the actuation of the computer device in accordance with a program.

In the control device, specifically, as shown in FIG. 1B, a turbine actuation command unit 50, a load request unit 51, a rotation speed control unit 52, a rotation speed detection unit 53, a load control unit 54, a fuel quantity control unit 55, an air supply quantity control unit 56 for the primary combustion field, and the like may be configured. More specifically, the turbine actuation command unit 50 may be configured to give a control command for an instruction of the actuation of the gas turbine, to the load request unit 51 and the rotation speed control unit 52, based on an instruction from a user and the like or a request from arbitrary equipment. The request or instruction that is given to the turbine actuation command unit 50 may be a request or instruction for operating the gas turbine at a predetermined rotation speed and predetermined load that may be appropriately set. The predetermined rotation speed may be a "rated rotation speed" that is set such that the gas turbine rotates stably or efficiently, but is not limited to this. The "load" is a work that is given to the load apparatus 5 through the turbine shaft 2 of the gas turbine 1, and may be expressed as a work rate per unit electric power in the case where the load apparatus 5 is an electricity generator. The "predetermined load" may be a "rated load" that is set such that the gas turbine performs output stably or efficiently, but is not limited to this.

The load request unit 51 may be configured to receive the control command from the turbine actuation command unit 50, to set a target value (target load value) of the magnitude of the load that is generated by the gas turbine, and to send the target value to the load control unit 54. The target load value may be the predetermined load in the instruction from the turbine actuation command unit 50. The rotation speed detection unit 53 may be configured to detect the rotation speed of the turbine shaft 2 using an arbitrary type of sensor, and to send the detected value to each unit.

The load control unit 54 may be configured to refer to the target load value from the load request unit 51 and the detected rotation speed value from the rotation speed detection unit 53, to decide a requested value (requested load value) of the magnitude of the load that needs to be given to the load apparatus at the current turbine rotation speed (detected rotation speed value), within a range in which the requested value does not exceed the target load value, and to send a control command for causing the load apparatus 5 to absorb a work corresponding to the requested load value, to the load apparatus 5.

Put briefly, the rotation speed control unit 52 is configured to refer to the control command from the turbine actuation command unit 50, the detected rotation speed value from the rotation speed detection unit 53, and the requested load value from the load control unit 54, and to execute the setting of a target value (target rotation speed value) of the rotation speed to be reached in the gas turbine based on the control command from the turbine actuation command unit 50, the start-up and stop of a starter 60, the instruction of fuel supply to the fuel quantity control unit 55, and the instruction of ignition to an igniter 61. On this occasion, the target rotation speed value may be the predetermined rotation speed in the instruction from the turbine actuation command unit 50. Further, the starter 60 may be controlled so as to be started up in response to the instruction of actuation start from the turbine actuation command unit 50 and to be stopped when the ignition by the igniter is executed. As to the instruction of fuel supply to the fuel quantity control unit 55, specifically, first, the requested value (requested rotation speed value) of the rotation speed that needs to be currently generated in the turbine shaft may be decided based on the detected rotation speed value of the turbine shaft 2 and the requested load value, and the requested rotation speed value may be given as the control command for the fuel supply to the fuel quantity control unit 55.

The fuel quantity control unit 55 may be configured to compare the detected rotation speed value and the requested rotation speed value, and to control the fuel quantity that is supplied from the fuel supply device 9, such that the detected rotation speed value coincides with the requested rotation speed value.

The air supply quantity control unit 56 may be configured to refer to the requested load value (or the target load value) from the load control unit 54 and the fuel quantity that is supplied from the fuel supply device 9 and to control the state of the flow rate control valve 11 for adjusting the compressed air quantity that is put in the primary combustion field 8a from the supply port 7a such that the NOx generation quantity is restrained without the misfire.

Relation Between Combustion Temperature and NOx Generation Quantity

Figure 2:
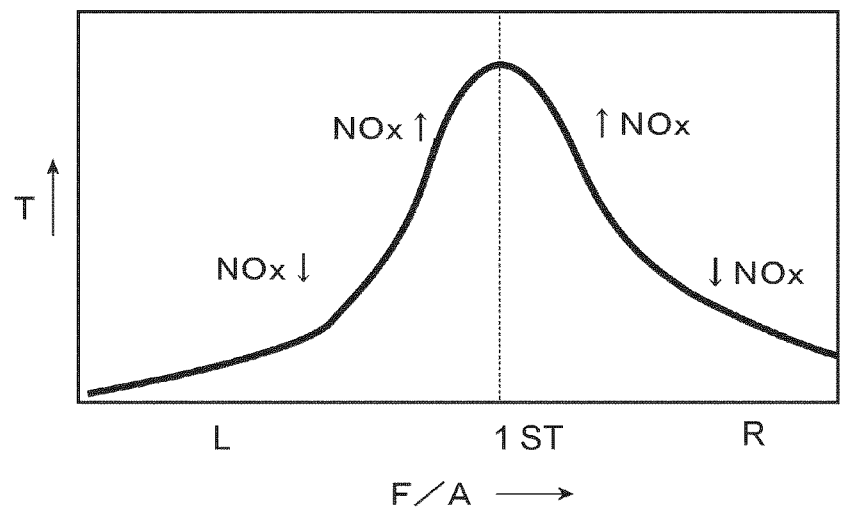
FIG. 2 is a diagram schematically showing a change in a combustion temperature T with respect to an equivalent ratio (fuel quantity/compressed air quantity) F/A.

As understood by a person skilled in the art, when the combustion temperature of the fuel and the compressed air within the combustion chamber rises, the NOx generation quantity increases. As shown in FIG. 2, when an equivalent ratio F/A is a stoichiometric air-fuel ratio (ST), a combustion temperature T is highest, and as the equivalent ratio F/A is lower than the stoichiometric air-fuel ratio (lean: L) or as the equivalent ratio F/A is higher than the stoichiometric air-fuel ratio (rich: R), the combustion temperature T decreases and the NOx generation quantity decreases. Accordingly, in the actuation of the gas turbine, it is desirable that there is as little fuel as possible, and therefore, for restraining the NOx generation quantity, it is desirable to combust the fuel and the compressed air in a lean state where the equivalent ratio is lower. Particularly, in the case where the fuel is hydrogen, the combustion temperature is high, and therefore, for restraining the NOx generation quantity, it is desired that the equivalent ratio is as low as possible within a range in which the misfire is avoided.

Figure 3A:
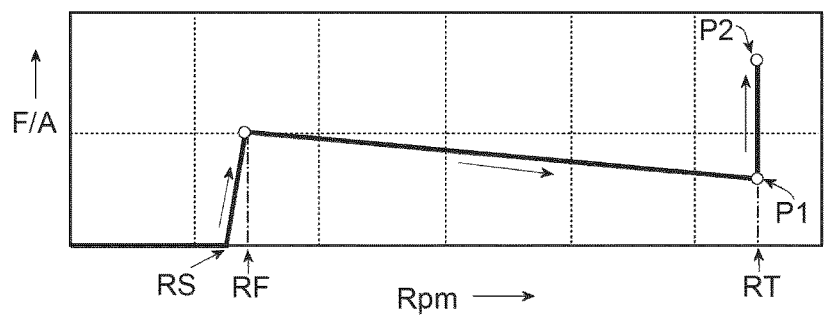
FIG. 3A is a diagram schematically showing a change in the equivalent ratio F/A with respect to increase in a rotation speed Rpm of a turbine shaft at the time of the start-up of the gas turbine in a general conventional operation technique.

Operation Technique for Gas Turbine (1) Conventional Operation Technique for Gas Turbine As described in SUMMARY, in the conventional operation technique at the time of the start-up of the gas turbine 1, generally, in the state with no load, the turbine rotation speed is raised to a rated rotation speed (a predetermined rotation speed that is ordinarily used at the time of the operation of the gas turbine), and thereafter the load is increased. At this time, the fuel supply quantity is increased while the rated rotation speed is kept. Specifically, at the time of the start-up of the gas turbine 1, as illustrated in FIG. 3A, first, the rotation of the turbine shaft 2 is started up by the starter 60, and the supply of the compressed air a into the combustion chamber 8 is started. In the case where the flow rate control valve 11 that causes the flow to escape in the middle of the flow passage 7b is not actuated, the supply quantity of the compressed air increases so as to correspond to the increase in the rotation speed of the turbine shaft 2. Then, when the rotation speed Rpm reaches RS, the fuel supply is started. When the rotation speed Rpm further reaches RF, the igniter 61 is actuated, and the combustion of the fuel and the air is started. Thereafter, as shown in the figure, in the state with no load (in the state where the load apparatus 5 is caused not to work), the fuel supply quantity is gradually increased until the rotation speed Rpm increases to reach the rated rotation speed RT. The reason why the equivalent ratio F/A decreases until the rotation speed Rpm reaches RT from RS in the figure is because the increase rate of the compressed air quantity is higher than the increase rate of the fuel quantity. Thereafter, when the load apparatus 5 is caused to work, while the rated rotation speed RT is kept (P1), the fuel supply quantity is increased, and the load is increased until the load reaches a rated load (a predetermined load that is ordinarily used at the time of the operation of the gas turbine) (P2).

In the case of the conventional operation technique described above with FIG. 3A, the operation state is put into the state P1 with the rated rotation speed and no load once, and then is caused to transition to the state P2 with the rated rotation speed and the rated load, and therefore it is necessary to secure a sufficient equivalent ratio F/A for avoiding the misfire at the primary combustion field 8a in the state P1 with the rated rotation speed and no load. That is, it is necessary to restrain the compressed air quantity that is put in the primary combustion field 8a (the compressed air quantity that is supplied from the supply port 7a), within the range in which the misfire is avoided even in the state P1 with the rated rotation speed and no load. Therefore, in that state, when the fuel supply quantity is increased for increasing the load to the rated load, the equivalent ratio F/A at the primary combustion field 8a increases so as to correspond to the increase in the fuel supply quantity, and the combustion temperature rises, so that the NOx generation quantity increases.

(2) Operation Technique for Gas Turbine in Embodiment

In the above conventional operation technique for the gas turbine, while the compressed air quantity to the primary combustion field 8a is adjusted such that the equivalent ratio that allows the misfire to be avoided is secured even in the state with the rated rotation speed and no load, the fuel supply quantity is raised for increasing the load, and the equivalent ratio rises so as to be the rise in the fuel supply quantity. In this regard, the research by the inventor of the embodiment has revealed that the state with the rated rotation speed and the rated load can be realized even at a lower equivalent ratio than an equivalent ratio obtained by raising the fuel supply quantity while the compressed air quantity to the primary combustion field 8a is adjusted such that the equivalent ratio that allows the misfire to be avoided is secured even in the state with the rated rotation speed and no load. That is, when the gas turbine is operated in the state with the predetermined rotation speed and the predetermined load that are ordinary used at the time of the operation of the gas turbine or in the state with the rated rotation speed and the rated load while the ratio of the compressed air quantity is increased compared to conventional ratios and the equivalent ratio is decreased, the combustion temperature can be decreased and the NOx generation quantity can be restrained. However, in the case of the configuration in which the compressed air quantity is increased for restraining the equivalent ratio at a low ratio in the state with the rated rotation speed and the rated load or in the state with the predetermined rotation speed and the predetermined load, the fuel quantity becomes further small in the state with the rated rotation speed and no load or in the state with the predetermined rotation speed and no load, and therefore the equivalent ratio becomes excessively low, so that the misfire can occur (when the misfire occurs, the restart of the gas turbine is necessary).

Figure 3B:
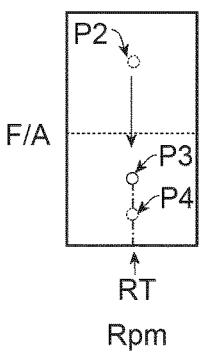
FIG. 3B is a diagram schematically showing a state where the equivalent ratio is changed while a turbine shaft rotation speed is kept at a predetermined rotation speed RT.

Hence, in the gas turbine in the embodiment, in the state with the predetermined rotation speed and the predetermined load that are ordinarily used at the time of the operation of the gas turbine, the compressed air quantity to the primary combustion field is increased and the equivalent ratio is decreased, for restraining the NOx generation quantity. Moreover, for avoiding the misfire even in the state with the predetermined rotation speed and no load, the reduction in the compressed air quantity to the primary combustion field 8a is executed in the state with the predetermined rotation speed and no load. The reduction in the compressed air quantity may be achieved by an arbitrary configuration. For example, as described with FIG. 1A, some of the compressed air flow may be caused to escape to the exterior or others by the flow rate control valve 11 provided in the middle of the flow passage 7b to the supply port 7a. In this configuration, as shown in FIG. 3B, in the state with the predetermined rotation speed RT, when the load is the predetermined load, the equivalent ratio is reduced from P2, which is the conventional equivalent ratio, to P3, and thereby the NOx generation quantity is reduced. On the other hand, when the load is no load, the fuel supply quantity is reduced (P4), and thereby the compressed air quantity to the primary combustion field 8a is reduced, so that the misfire can be avoided.

Figure 4:
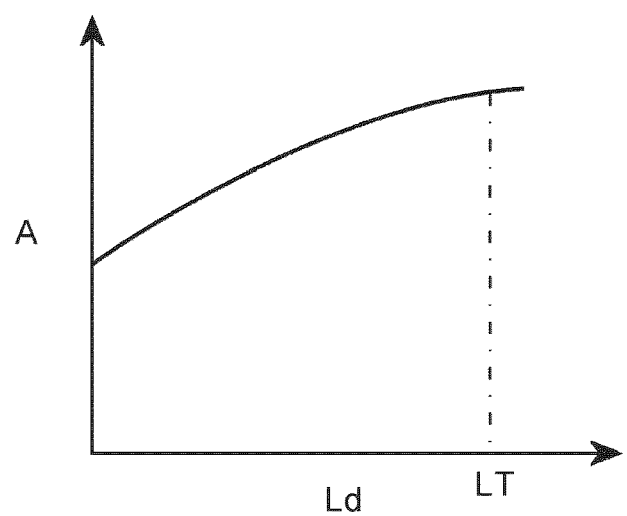
FIG. 4 is a diagram showing a change in a compressed air quantity A to a primary combustion field with respect to a load Ld in the gas turbine according to the embodiment.

In the above configuration in the embodiment, for example, the increase in the compressed air quantity that is supplied to the primary combustion field 8a in the state with the predetermined rotation speed and the predetermined load may be achieved by enlarging the bore of a supply port for the compressed air that is opened toward the primary combustion field 8a. In the actual configuration, the compressed air quantity that is supplied to the primary combustion field 8a in the state with the predetermined rotation speed and the predetermined load may be set by adaptation. Preferably, the compressed air quantity that is supplied to the primary combustion field 8a in the state with the predetermined rotation speed and the predetermined load may be set to a quantity that gives an available lower limit (the value may be higher to some extent than the lower limit of the equivalent ratio that allows the misfire to be avoided, in consideration of the stability of the control) of the equivalent ratio that allows the misfire to be avoided in the state with the predetermined rotation speed and the predetermined load, for restraining the NOx generation quantity as much as possible. Further, as schematically illustrated in FIG. 4, a compressed air quantity A that is supplied to the primary combustion field 8a at the time of the predetermined rotation speed may be adjusted so as to be reduced as the magnitude of a load Ld is smaller. In that case, when the compressed air quantity that is supplied to the primary combustion field 8a in the state with the predetermined rotation speed RT and the predetermined load LT is given such that the equivalent ratio is restrained so as to be as low as possible within the range in which the misfire is avoided, the compressed air quantity that is supplied to the primary combustion field 8a may be set to a quantity that gives an available lower limit of an equivalent ratio that allows the misfire to be avoided in the state with a load at that time, with the reduction in the load Ld.

Thus, in the above gas turbine in the embodiment, the compressed air quantity that is supplied to the primary combustion field 8a is changed depending on the magnitude of the load. Therefore, it is possible to sufficiently reduce the equivalent ratio in the state with the predetermined rotation speed and the predetermined load, and to reduce the NOx generation quantity, and moreover it is possible to avoid the misfire in the state with the predetermined rotation speed and no load. In other words, it is not necessary to restrict the supply quantity of the compressed air in the state with the predetermined rotation speed and the predetermined load, for meeting the equivalent ratio that needs to be secured for avoiding the misfire in the state with the predetermined rotation speed and no load, and it is possible to increase the compressed air supply quantity such that the misfire is avoided in the state with the predetermined rotation speed and the predetermined load, and to restrain the NOx generation quantity. It should be understood that the embodiment may be used for an arbitrary type of gas turbine and does not require a complicated structure for preventing the non-uniformity of combustion concentration at the primary combustion field.

The above description has been made about the embodiment of the present disclosure, but it is clear that a person skilled in the art can easily perform many modifications and alterations and the present disclosure is not limited to only the embodiment exemplified above and can be applied to various devices without departing from the concept of the present disclosure.

What is claimed is:
1. A gas turbine comprising:
   a turbine shaft;

a compressor of air;
a combustor to which fuel and compressed air to be combusted are supplied;
a valve provided in a flow passage through which the compressed air is fed from the compressor to the combustor;
a processor; and
a memory storing instructions that cause the processor to perform functions comprising:
controlling a fuel quantity supplied to the combustor;
controlling a target value for a rotational speed of the turbine shaft;
controlling a magnitude of a load that acts on the turbine shaft; and
controlling a compressed air quantity supplied to a primary combustion field in the combustor, wherein
the processor further performs, according to the instructions, functions comprising:
increasing the target value of the rotational speed from zero to a first rotational speed for a start-up of the gas turbine, and maintaining the first rotational speed; and
setting the magnitude of the load to no load while the rotational speed increases from zero to the first rotational speed, and
increasing the magnitude of the load from no load to a predetermined load in response to the rotational speed reaching the first rotational speed; and
the compressed air quantity controlled by the processor and the fuel quantity controlled by the processor satisfy the following conditions (i) to (iii):
(i) while the magnitude of the load is set to no load and the rotational speed of the turbine shaft increases from zero to the first rotational speed, the compressed air quantity and the fuel quantity increase so as to correspond to an increase in the rotational speed of the turbine shaft, and an equivalent ratio is higher than or equal to a lower limit value that allows a misfire to be avoided, the equivalent ratio being a ratio of the fuel quantity to the compressed air quantity,
(ii) while the first rotational speed is maintained and the magnitude of the load increases from no load to the predetermined load, the compressed air quantity is held constant so as to correspond to the first rotational speed, the fuel quantity is increased so as to correspond to an increase in the magnitude of the load, and the equivalent ratio is higher than or equal to the lower limit value, and
(iii) while the first rotational speed is maintained and the magnitude of the load decreases from the predetermined load, the compressed air quantity and the fuel quantity are decreased so as to correspond to a decrease in the magnitude of the load, and the equivalent ratio is higher than or equal to the lower limit value,
the valve causes a portion of the compressed air to escape from the flow passage in an open state and prevents the compressed air from escaping from the flow passage in a closed state, and
the processor further performs, according to the instructions, controlling the valve to switch to the closed state under the condition (i).

2. The gas turbine according to claim 1, when the fuel is hydrogen.

3. The gas turbine according to claim 1, wherein
under the condition (i), an increase rate of the compressed air quantity is higher than an increase rate of the fuel quantity, and the equivalent ratio decreases as the rotational speed increases and is higher than the lower limit.

4. The gas turbine according to claim 1, wherein
the first rotational speed is a rated rotational speed, and combustion of the fuel and the air is started when the rotational speed reaches a second rotational speed that is lower than the rated rotational speed.

* * * * *